United States Patent [19]

Hauner

[11] Patent Number: 5,628,448
[45] Date of Patent: May 13, 1997

[54] PROCESS FOR BONDING A CONTACT LAYER OF SILVER-METAL OXIDE MATERIAL AND METAL CONTACT BASE, AND SUITABLE CONTACT LAYER

[75] Inventor: Franz Hauner, Röttenbach, Germany

[73] Assignee: Siemens Aktiengesellschaft, München, Germany

[21] Appl. No.: 617,768

[22] PCT Filed: Sep. 20, 1994

[86] PCT No.: PCT/DE94/01090

§ 371 Date: Mar. 19, 1996

§ 102(e) Date: Mar. 19, 1996

[87] PCT Pub. No.: WO95/08833

PCT Pub. Date: Mar. 30, 1995

[30] Foreign Application Priority Data

Sep. 20, 1993 [DE] Germany .................. 43 31 913.0

[51] Int. Cl.[6] .................................................. H01H 11/06
[52] U.S. Cl. ..................... 228/198; 228/230; 148/537; 29/874; 29/885; 200/265
[58] Field of Search .................................... 228/198, 203, 228/230; 148/524–526, 537; 200/265, 266; 29/874, 879, 885

[56] References Cited

U.S. PATENT DOCUMENTS

| | | | |
|---|---|---|---|
| 3,688,067 | 8/1972 | Shibata | 200/265 |
| 4,112,197 | 9/1978 | Metz | 29/874 |
| 4,204,863 | 5/1980 | Schreiner | 200/265 |
| 4,472,211 | 9/1984 | Shibata | 148/527 |

FOREIGN PATENT DOCUMENTS

| | | |
|---|---|---|
| 0170812 | 5/1985 | European Pat. Off. . |
| 0164664 | 5/1985 | European Pat. Off. . |
| 0288855 | 4/1988 | European Pat. Off. . |
| 9222080 | 12/1992 | WIPO . |

*Primary Examiner*—Samuel M. Heinrich
*Attorney, Agent, or Firm*—Kenyon & Kenyon

[57] ABSTRACT

A contact facing is normally bonded to the carrier by brazing or welding, for which purpose, the bonding side has to have a suitable layer. According to the invention, prior to the bonding operation, the contact facings are treated without fusion in such a way that the metal oxide is at least partially reduced to metal at least on the solder side at the surface and in the subsurface region of the contact facing. The reduction can be carried out by heat treatment in reducing atmosphere. In the case of contact materials based on silver/iron oxide ($AgFe_2O_3/Fe_3O_4$), in particular, the iron oxide may also be reduced to iron on the switching side since iron oxide is again formed after switching. Alternatively, contact facings may be provided with carbon as reducing agent on the solder side. In particular, the reduction may take place locally in this case.

14 Claims, 1 Drawing Sheet

PROCESS FOR BONDING A CONTACT LAYER OF SILVER-METAL OXIDE MATERIAL AND METAL CONTACT BASE, AND SUITABLE CONTACT LAYER

BACKGROUND OF THE INVENTION

The invention relates to a method of bonding contact facings composed of cadmium-free silver/metal oxide materials which contain at least tin oxide or iron oxide as the essential metal oxide to a metallic contact carrier, in particular by brazing or welding. In addition, the invention also relates to associated contact facings.

Silver/metal oxide contact facings can be formed as individual contact pieces or as linearly extended contact profiled sections or contact strips. Such contact facings have to be electrically and mechanically bonded to metallic contact carriers. Contact facings of this type cannot always be reliably bonded to the contact carriers by the known methods of brazing or welding. Frequently, contact facings of this type are therefore provided with a layer of pure silver. This layer can be applied by various production methods: in the case of profiled sections, it is done by cladding the contact-material strips or by direct two-layer extrusion, but when manufacturing molded articles it is done by by pressing two separately introduced layers. In all cases, the application of the pure-silver layer is associated with an increased technical complexity in the manufacture. This entails an additional financial cost which results in an appreciable increase in price of such contact facings.

In the case of single-layer contact facings which are to be applied by soldering to metallic contact carriers, German Offenlegungsschrift 22 60 559 has already proposed dissolving the metal oxide component out chemically in order to achieve better soldering properties. The latter has not, however, gained acceptance in practice since only the oxides situated directly at the surface are dissolved out by the chemical removal of the metal oxide component. In the soldering process, however, silver is generally dissolved by the solder, with the result that an inadequate oxide removal results in a poor wettability and not, consequently, in a reliable soldering. From SU-A-1108522 it is known to reduce the solder side of contact pieces composed of silver/metal oxide materials by means of electrochemical processes in order to make bonding to the contact carrier possible without a separate silver layer. Finally, with JP-A-5-182558 is described the manufacture of silver-metal oxide/metal compound arrangements based on silver/cadmium oxide, strips of silver/cadmium oxide material which can contain further metal oxides as minor constituents being heated by current heating in a $N_2/CO$ atmosphere and a selective reduction being carried out at the surface of the strip. With these means a silver/cadmium solder is formed in the subsurface region of the contact facing, which means the switching properties on the switching side get lost. Therefore, after the bonding of the contact pieces to the contact carrier, the contact side must again be oxidized to higher valency.

SUMMARY OF THE INVENTION

In contrast, the object of the invention is to render contact facings composed of materials based on silver/tin oxide or silver/iron oxide solderable without separately applying a pure-silver layer.

According to the invention, the object is achieved in that, prior to the bonding operation, the contact facings are treated without fusion in such a way that the metal oxide is at least partially reduced to metal at least on the solder side both at the surface and also in the subsurface region of the contact facing. If the reduction parameters are chosen so that the reduced layer is sufficiently thick, a reliable soldering can be achieved.

Figure 1:
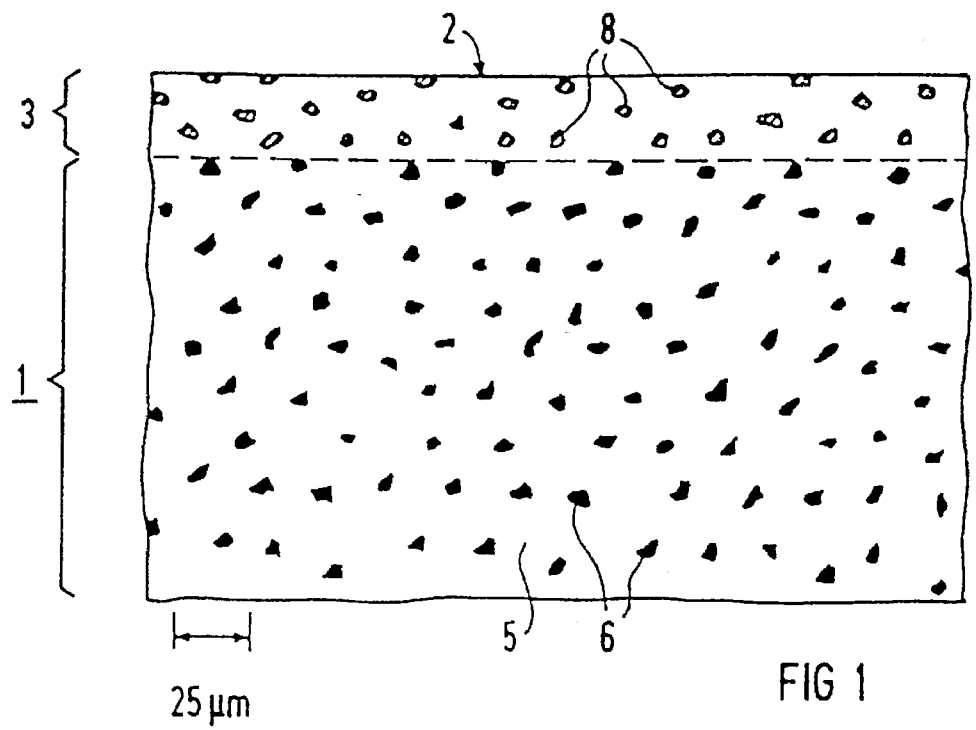
FIG. 1 illustrates a metallographic polished section of the surface and of the subsurface region of a contact piece composed of $AgFe_2O_3$.

The method according to the invention is advantageously applied in the case of contact facings composed of $AgSnO_2Bi_2O_3$ CuO materials, on the one hand, or composed of $Ag/Fe_2O_3$ or $Ag/Fe_2O_3/ZrO_2$ materials, on the other hand. In the exceptional case, a partial reduction of a metal oxide may already be sufficient.

Within the scope of the invention, the metal oxide at the surface and in the subsurface region can be reduced in various ways. Preferably, it is done by a heat treatment of the contact facings in reducing gas atmosphere. For this purpose, the heat treatment can be carried out in a roasting furnace or by inductive heating of the metallic contact facing. It can, however, also be done by radiation from a suitable high-energy lamp, fusion of the material not yet occurring in the case of said radiation. Suitable for the reducing atmosphere are, in particular, hydrogen, forming gas or, alternatively, carbon monoxide.

EP-A-0 288 585 proposes a method of producing a solderable or weldable underside on silver/MeO contacts, in which the underside of the contact platelet is to be punctiformly fused and reduced by means of a laser beam which travels in raster fashion. For this purpose, the surface of the contact platelets has first to be subjected to a pretreatment in order to prevent a reflection of the laser beam. During the coupling-in of laser radiation, local overheatings always occur and this can result in undesirable microstructure changes.

To reduce the metal oxide at the surface and in the subsurface region without fusion, it may be advantageous to provide the contact facings on the solder side with carbon and to subject them, in this way, to a heat treatment. It is thereby possible to achieve a local reduction only in the solder region. For this purpose, the carbon may, for example, be sprayed as graphite onto the solder side.

In addition to the above methods in which the solder side is specifically treated and the contact side of the contact facing is otherwise left unaffected if possible, the metal oxide may also be reduced to metal on all sides at the surface and in the subsurface region, especially if the metal which the metal oxide comprises is insoluble or only slightly soluble in silver. The latter method is advantageously possible, in particular, if the contact material-contains especially iron oxide in addition to silver. In this case, the iron oxide is also reduced to iron on the switching side, especially as a result of roasting and the contact layer consequently contains iron in the fresh state. Since this layer is normally only a few μm thick, however, the switching properties are not impaired. On the contrary, it appears that, even during or after the first switching of the contacts, iron oxide from the parent material also has an effect in the switch microstructure or that the iron is reoxidized.

Further details and advantages of the invention emerge from the description of exemplary embodiments below, reference being made in some cases to the micrographs. In each case in accordance with the treatment according to the invention.

EXAMPLE 1

Contact facings are produced from a material having the constitution $AgSnO_2Bi_2O_3CuO$. Contact materials of this type and the associated powder-metallurgy production are disclosed in EP-A-0 164 664 and EP-A-0 170 812, the use of internally oxidized alloy powders being specified therein. In addition, suitable boundary conditions are adhered to for the concentrations of the individual components of the alloy. The contact pieces are produced therein by sintering as a moulding.

After production of the moulded contact pieces by sintering, a subsurface reduction of the metal oxides is advantageously carried out by inductive heating in forming gas which can be specifically controlled as a function of the frequency.

Optionally, an energy radiation treatment by means of a high-energy lamp is also possible for heating purposes. A high-energy lamp has an energy density which is such that fusion and, consequently, a liquid phase does not yet generally exist, but a temperature distribution sufficient for the rapid reduction of the interfering oxides is nevertheless present in the surface region. For this heating it may be beneficial to use carbon as reducing agent instead of the reducing gas atmosphere. In particular, the solder side of contact facings may be sprayed with graphite so that the metal oxide is reduced only in this region.

EXAMPLE 2

Recently, silver/iron oxide materials have proved satisfactory in practice. For example, a contact material $Ag/Fe_2O_310$ has been investigated. Since the internal oxidation of an alloy powder is impossible because of the low solubility of the iron in the silver, separate powders composed of silver and iron oxide were mixed together to produce this material. Contact facings are produced by known sintering methods as a moulding or strip.

If contact facings of this type are roasted for half an hour at 500° C. in hydrogen, a substantially complete reduction of the iron oxide to iron results in a region of up to approximately 20 μm. In FIG. 1, the parent material of the contact piece having a composite microstructure is denoted by 1, the surface of the contact piece by 2 and the surface region by 3. The region of the parent material 1 comprises a silver matrix 5 having iron oxide particles 6 which are incorporated therein and which form dark particles. It can be seen that no iron oxide particles 6 are present at the surface 2 and 3 in the region 3 but brighter iron particles which have been produced by the reduction.

A proportion of less than 10% by mass of iron in the silver after the reduction results in a reliable solder joint if a suitable solder is used. The same bonding technologies as in the prior art with a separate silver layer are therefore possible in a known manner, provided the reduction parameters are appropriately chosen.

Since, in particular, the switching area is also reduced in the procedure described, iron in elemental form is initially present in the fresh state in contact pieces. As a result, the temperature characteristics may be slightly altered during the first switching operations and may adjust to the desired value only in the course of the switching operations.

EXAMPLE 3

For application in various low-voltage contactors, materials based on silver/iron oxide with an additional zirconium oxide component, in particular a contact material $Ag/Fe_2O_35.4/ZrO_21$, have proved satisfactory. Such materials are described in the earlier, non-prior-published Patent Application WO-A-92/22080. Since silver, iron and zirconium have only a low solubility, this material is produced by powder metallurgy by mixing the individual metal oxide powders. A strip or profiled section of this material from which separate contact pieces can be cut to length later can thereby be produced by an extrusion technique.

If such a strip is roasted in a roasting furnace in hydrogen at a temperature of 500° C. for a time of about half an hour, the iron oxide at the surface and in the subsurface region of the strip is reduced to a depth of approximately 200 μm. The zirconium oxide, which is present in a comparatively small amount, virtually does not yet undergo any reaction at a heating temperature of 600° C. so that no reduction takes place in this respect.

Figure 2:
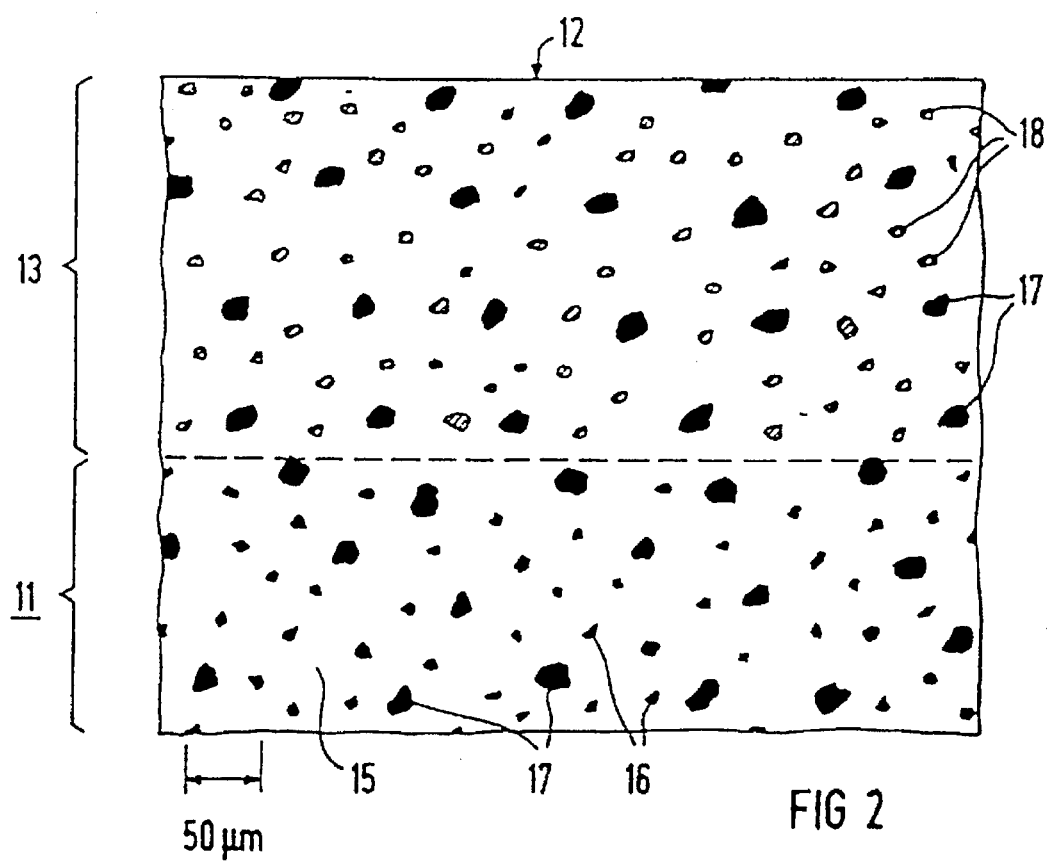
FIG. 2 illustrates a metallographic polished section of the surface and of the subsurface region of a contact piece composed of $AgFe_2O_3ZrO_2$.

Cutting to length consequently yields contact pieces in which the solder side only has zirconium oxide as metal oxide. An associated micrograph is shown in FIG. 2. According to FIG. 2, an internal region 11 containing parent material, a surface 12 of the contact piece and a subsurface region 13 are present. It can be seen that the parent material 11 comprises a silver matrix 15 containing metal oxide particles 16 and 17 composed of $Fe_2O_3$, on the one hand, and of $ZrO_2$, on the other hand, the iron oxide being comparatively finely divided and the zirconium oxide comparatively coarsely divided. In the subsurface region 13, on the other hand, iron particles reduced from $Fe_2O_3$ are present as brighter particles, but the $ZrO_2$ is left unaltered as coarse particles.

It has been found that a contact piece treated in this way and containing silver/iron as the majority component at the surface can be reliably soldered. It is found especially in this system that the switching properties, in particular the temperature behaviour, are not substantially changed since zirconium oxide is also present at the switching side in the fresh state of the contact pieces and, in addition, even after a few switching operations, the iron particles are oxidized as a result of energy conversion in the case of air-brake contactors and, consequently, the specified constitution and concentration of the contact material is regained.

What is claimed is:

1. A method for bonding a contact layer composed of a cadmium-free silver/metal oxide material which contains at least tin oxide or iron oxide as an essential metal oxide to a metallic contact base, comprising the steps of:
    subjecting the contact layer to a heat treatment under a reducing atmosphere and without fusing taking place,
    reducing the metal oxide at least partially to metal on a bonding side of the contact layer without an alloy formation, and in a subsurface region of a switching side of the contact layer; and
    subsequently bonding the contact layer to a metallic contact base.

2. The method according to claim 1, wherein the heat treatment is carried out in an annealing furnace.

3. The method according to claim 2, wherein the heat treatment is carried out by inductive heating.

4. The method according to claim 2, wherein the heat treatment is carried out locally by radiation with high energy density.

5. The method according to claim 2, wherein the reducing atmosphere is hydrogen ($H_2$).

6. The method according to claim 2, wherein the reducing atmosphere is forming gas.

7. The method according to claim 2, wherein the reducing atmosphere is carbon monoxide.

8. The method according to claim 1, wherein the contact layer is provided with carbon on the bonding side and is subjected to a heat treatment.

9. The method according to claim 8, wherein the carbon is applied as graphite onto the bonding side.

10. The method according to claim 1, wherein the contact layer is composed of $AgSnO_2Bi_2O_3CuO$ produced by inner oxidation of alloy powder.

11. The method according to claim 1, wherein the contact layer is composed of $Ag/Fe_2O_3$ produced by a powder mixture.

12. The method according to claim 1, wherein the contact layer is composed of $Ag/Fe_2O_3/ZrO_2$ produced by a powder mixture.

13. A contact layer produced by the following process: heat treating a layer comprising silver and iron oxide ($Fe_2O_3/Fe_3O_4$) under a reducing atmosphere without fusion; and reducing the iron oxide at least partially to iron on a bonding side of the layer, without alloy formation, and in a subsurface region of a switching side of the layer, and on the switching side of the layer.

14. The contact layer according to claim 13, further comprising zirconium oxide ($ZrO_2$).

* * * * *